United States Patent

Touch et al.

[11] 3,904,167
[45] Sept. 9, 1975

[54] ELECTRIC WATER FAUCET

[76] Inventors: Joseph Touch; Dianne Ellen Touch, both of Rt. 2, Box 260, San Antonio, Tex. 78228

[22] Filed: July 2, 1973

[21] Appl. No.: 375,510

[52] U.S. Cl. .................................. 251/14; 251/30
[51] Int. Cl.² ................ F16K 31/02; F16K 31/363
[58] Field of Search .................... 251/14, 25, 30

[56] References Cited
UNITED STATES PATENTS

| | | | |
|---|---|---|---|
| 1,862,937 | 6/1932 | Littlefield | 251/30 |
| 2,291,101 | 7/1942 | Papulski | 251/30 |
| 2,605,079 | 7/1952 | Miller et al. | 91/454 X |
| 2,830,784 | 4/1958 | Placette | 251/14 |
| 3,399,689 | 9/1968 | Keane | 137/596.17 X |
| 3,598,148 | 8/1971 | Kroffke | 137/596.16 |

Primary Examiner—Henry T. Klinksiek
Attorney, Agent, or Firm—Willard J. Hodges, Jr.

[57] ABSTRACT

The electrical water faucet is designed to control the flow of water from an outlet, through the use of switches controlling electrical solenoids. This unit can be installed in remote areas to confine static service line water pressures. This electrical water faucet has a manual control to operate it if electrical power should fail.

7 Claims, 2 Drawing Figures

ELECTRIC WATER FAUCET

Our conception of the electric water faucet is a new and modern method for the installation and use of a water valve, electrical water faucets will control the flow of water from the service line to various outlets in a more convenient, safer and economical manner.

A determining safety feature accomplished with the electric water faucet installation, over the present day water faucet system, is in the fact that static pressure from the service line is eliminated throughout the branch line, to each existing outlet. With existing installations, potential flooding hazzards exists whenever a branch line is punctured or ruptured, damaging conditions arise when this happens. In a large structure, water can be trapped in hidden areas until the weight exceeds the breaking point of various sections. This will hold true because a large section of the plumbing system is hidden from view in walls, ceilings and floors. In contrast to the situation presented above, my invention of the electric water faucet eliminates that serious condition.

Locating the valve close to the service line will isolate static pressure at that point, thereby eliminating static pressure completely from hidden areas. Consequently there will be no flooding without static pressure or flow in a branch line using my invention. Present day water faucets are located at the end of the plumbing, and blockage of the plumbing brought about for any reason, including frozen lines, cannot be compensated for, pressure remains constant, and flooding awaits the break. In our design of the electric water faucet it will automatically close, should line blockage occur while in the open position. If the valve is in the closed position and the line is incapable of flowing, the valve will remain closed.

The electric water faucet will only allow a running leak from a branch line that has been damaged, during the time that flow is required. The common faucet being located at the outlet will allow a branch line to leak constantly whether flow is required or not.

Switches or timers are used to operate the electric water faucet. The safety features from this standpoint are in the placement of the controls. An example would be to locate bath controls beyond the reach of small children, this would prevent a small child from being scalded. It would also prevent children from changing the water level a mother considers safe for their age.

When electric water faucets are located so as to confine and isolate the service line, the safety feature is the fact that static pressure will also be confined and isolated.

The convenience of the electric water faucet would be obvious to the user. For example fingertip control would be preferred over the present method. An electric water faucet controlled by a timer will regulate the water level automatically. This combination can be considered a time and water saving device. Because of the omission of static service line pressures in a branch line with the electric water faucet, pipe banging caused by locking water flow at the outlet, will be eliminated. Faucet noise will also be removed by the electric water faucet installation. Changes in temperature selections, caused when other outlets are turned on, are negligible. The design of this electric water faucet requires only a fraction of service line pressure to operate, for this reason, the controlling parts remain steadfast.

Economy for builders and installers is evident by the reduction of time and materials. If the present plumbing and fittings are used with this invention, the reduction in cost will be acquired by the elimination of cutoff valves at each outlet. Where no static pressure exists in a branch line the need for a cutoff is removed.

We have designed the electric water faucet to be constructed with any suitable material capable of withstanding any service line pressures. The most desirable production method is to mold the unit of plastic for economy, reliability and endurance, and to operate by electric solenoids. The solenoid is a troublefree and lasting device. Our invention was designed solely for the use of electric solenoids over motors to drive the unit. Because of this a major breakthrough in expense for electric water faucets has been accomplished.

DESCRIPTION OF THE PREFERRED EMBODIMENT

FIG. 1

Electric Water Faucet

Figure 1:
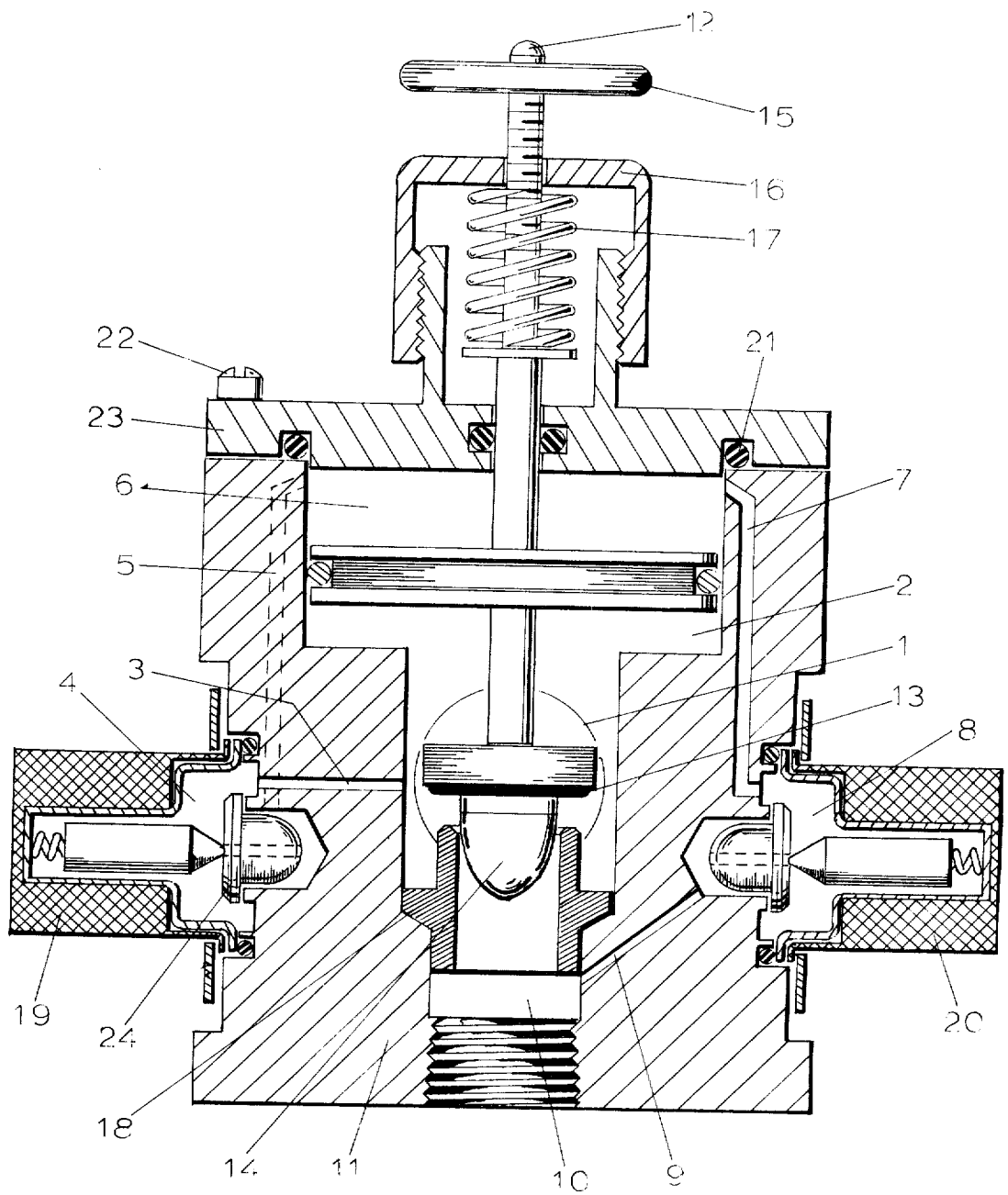
FIG. 1 is a sectional view of the control valve of the invention.

Numerical code listing
- 1—PORT, inlet from service line.
- 2—CHAMBER, primary pressure.
- 3—PASSAGE, pressure supply to closing solenoid.
- 4—CHAMBER, closing solenoid.
- 5—PASSAGE, pressure to secondary chamber.
- 6—CHAMBER, secondary pressure.
- 7—PASSAGE, from secondary chamber to opening solenoid.
- 8—CHAMBER, opening solenoid.
- 9—PASSAGE, pressure spill from opening solenoid.
- 10—PORT, outlet to branch line.
- 11—HOUSING, valve body.
- 12—SHAFT & PISTON.
- 13—SEAL, shutoff.
- 14—DIAMETRICAL RESTRICTOR.
- 15—HANDLE, alternate.
- 16—CAP, adjustable.
- 17—SPRING, head pressure compensator.
- 18—SEAT.
- 19—SOLENOID, closing.
- 20—SOLENOID, opening.
- 21—SEAL, typical detail.
- 22—SCREW, valve cap.
- 23—CAP, valve housing.
- 24—SEAT, multi-purpose.

FIG. 1

The drawing is a sectional view, and displays the valve in a partial flow condition.

The electrical water faucet housing 11 is cylindrical in design, it has a inlet port 1 and an outlet port 10. The valve is operated with two solenoids mounted on the housing 11. A cap 23 is secured to the housing 11 with screws 22, and is sealed with an O ring in a groove, as indicated by a symbol 21 which is typical throughout the valve. The valve cap also houses a spring 17, and is threaded for an adjustable cap 16.

The valve is connected to the service line in a conventional manner to the inlet port 1, which is the largest port and is indicated by a circle 1.

The flow of water enters the inlet port 1, and fills the primary pressure chamber 2, as the pressure increases in this chamber, the flow through the valve seat 18 is restricted.

The diametrical restrictor 14 as shown in the drawing, is slightly withdrawn from the valve seat 18, allowing only a partial flow. As pressure in the primary pressure chamber 2 increases to any service line value, it will bleed through the closing solenoid passage 3 and enter the closing solenoid chamber 4.

With electrical power applied to the closing solenoid 19 the plunger is withdrawn from the seat, this action introduces controlling pressure bleedoff to the secondary chamber passage 5. As bleedoff continues, it fills the secondary chamber 6 and enters a passage 7 from the secondary chamber 6, to the opening solenoid chamber 8, at this point controlling pressure is blocked by the solenoid 20.

If electrical power to the closing solenoid 19 is not interrupted, pressure in the secondary chamber 6 will reach the service line pressure value, this will start the closing cycle. The head pressure compensator spring 17 being slightly compressed, exerts its effort on the shaft and piston 12 toward the closed position. The energy of the spring 17, controlling pressure bleedoff from passage 5, and force acting on the back side of the shutoff seal 13 base, from the flow passing over it, are now a higher value than service line pressure, therefore the shaft & piston 12 are forced downward, and the valve closes.

In the fully closed position, the combined forces to keep it closed, are the spring 17 acting on the shaft and piston 12, service line pressure in the primary pressure chamber 2 acting on the top of the shutoff seal 13 base, and pressure locked in the secondary pressure chamber 6.

To open the valve, electrical power is applied to the opening solenoid 20. When the solenoid plunger is pulled off its seat, controlling pressure from the secondary chamber 6 is released through the passage 7, and the solenoid chamber 8, into the spill passage 9. From the spill passage 9 the controlling pressure is dumped into the outlet 10. As long as the solenoid remains energized, pressure is drained from the secondary chamber 6. With pressure decreasing in the secondary chamber 6, to a value lower than the primary chamber 2 and the spring 17, the shaft and piston 12 will move upward. The shutoff seal 13 and the diametrical restrictor 14 are connected to the base of the shaft and piston 12, and will move upward also. As the space between the shutoff seal 13 and the valve seat 18 increases, flow will also increase through the valve seat 18 to the outlet port 10 and into the branch line.

To select a desired flow out of the branch line, energize the opening solenoid 20 until the required amount is observed, then de-energize the solenoid 20, this blocks the draining of pressure from the secondary chamber 6. With pressure unable to drain, the shaft and piston 12 cannot displace the locked pressure in the secondary chamber 6, and the service line pressure used to force the shaft and piston 12 up, now holds it in a selected position. The diametrical restrictor 14 determines the flow and maintains controlling pressure by the position of the shaft and piston 12.

The emergency operation of the electric water faucet is a simple operation. If electrical power is not available to open the valve. The handle 15 is turned in a clockwise direction until it bottoms against the cap 16 and pulls the shaft and piston 12 upward. The shutoff seal 13 and diametrical restrictor 14 are pulled away from the seat 18 and flow starts. Pressure in the secondary chamber 6 is forced backwards, through the multipurpose solenoid plunger seat 24 and its base into the primary chamber 2, and joins the flow in the outlet port 10.

To close the valve if electrical power is not available, the handle 15 is turned in a counterclockwise direction to the top of the shaft, then pushed down until the valve seats. Suction created in the secondary chamber 6, by the downward movement of the shaft and piston 12, will be relieved through the passage 9 as a multipurpose solenoid plunger seat is pulled off its base.

The term, "head pressure," is to mean, the weight of water and restriction to flow at the outlet port 10. Head pressure in the outlet port 10 is a minor opposing force to the shaft and piston closing cycle. To reduce this force, head pressure energy is directed toward the center of the diametrical restrictor 14 by design. The various head pressures encountered because of branch line installations, are further compensated for by loading or unloading the spring 17 with the adjustable cap 16.

Automatic closing of the valve will occur when the outlet or branch line becomes completely blocked. When pressure increases to service line value in the outlet port 10, it can be seen that all chambers and passages are equal in pressure value. With electrical power applied to the opening solenoid 20, the solenoid plunger is pulled from its seat, this opens an unrestricted path to the secondary chamber 6, and water will transfer to the secondary chamber 6, while the spring 17 forces the valve closed. The valve will remain closed as long as line blockage exists.

The inlet port being larger than the outlet port, prevents pressure or flow from reversing across the valve shaft and piston 12 base, for this reason minor pressure drops in the service line, caused by opening other valves, will not change the position of the valve, therefore selected temperatures at the outlet remain unchanged.

FIG. 2

Figure 2:
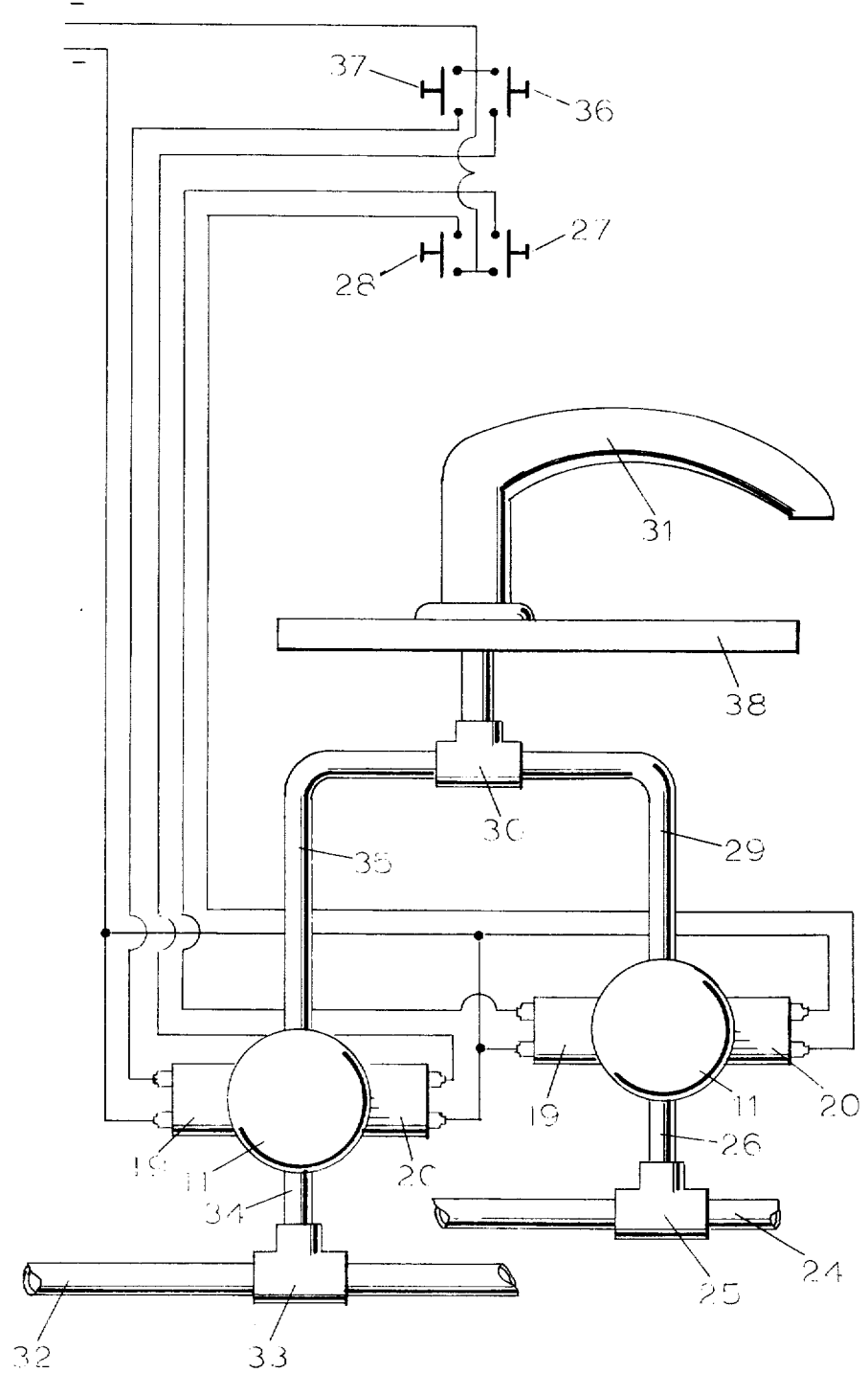
FIG. 2 is a schematic diagram of push button controls for the control valve.

FIG. 2 is a schematic showing a simplified electrical operating circuit, and a diagrammatical electric water faucet installation.

Line 39 is a service line, supplying a source of water and pressure to all cold water faucets and a standard hot water tank, to line 39 an electric water faucet 11 is connected by a joining tee 25 and piping 26. When a cold water electric faucet 11 opening solenoid 20 is activated by a switch 28, flow enters a branch line 29 and a joining tee 30 to exit an outlet 31. When an electric water faucet is closed, pressure cannot enter a branch line, therefore no static pressure in a branch line exists because of the omission of outlet cutoff valves, or flow regulating devices.

By design of the electric water faucet, flow requirements are accomplished merely by pressing a switch until the desired results are observed, then releasing the switch. The flow selected will remain constant. Conversely if a decrease in flow is required, a switch 27 is pressed, activating the closing solenoid 19 until a desired flow again results, then the switch is released, again flow remains constant. Any variation of flow requirements from a few drops to full flow can be obtained with this electric water faucet. The time required to accomplish full flow can be varied from a minimum of 4 seconds, by activating an opening switch for 4 interrupted seconds, to a maximum time desired, by alternating engage and release of a switch.

An electric water faucet 11 connected to a hot water source line 32 by a joining tee 33 and piping 34, accomplishes the same results and methods as for the cold water requirements, except hot water enters a branch line 35, then enters the same joining tee 30 connected to the cold water branch. With both hot and cold branch lines joined at tee 30 a variation of temperatures can be accomplished by increasing or decreasing the flow from one or the other electric water faucets.

The hot water electric water faucet 11 opening solenoid 20 is controlled by a switch 36 and the closing solenoid 19 is controlled by a switch 37. Item 38 is any outlet location.

What we claim is:

1. An electric solenoid controlled faucet comprising:
   a. a faucet housing substantially encasing a cylindrical chamber,
   b. a piston secured to a shaft movably mounted in the cylindrical chamber in said housing,
   c. said piston dividing said cylindrical chamber into an upper secondary chamber and a lower primary chamber,
   d. a closing solenoid operably mounted on said housing,
   e. a closing solenoid passage leading from said lower primary chamber to,
   f. a chamber of said closing solenoid,
   g. a secondary chamber passage extending through the faucet housing interconnecting said chamber of said closing solenoid and said secondary chamber,
   h. said secondary chamber passage receiving fluid pressure from said primary chamber through said chamber of said closing solenoid to said secondary chamber when said closing solenoid is open applying pressure to said piston closing said faucet,
   i. an opening solenoid operably mounted on said housing,
   j. a passage projecting through said faucet housing interconnecting said secondary chamber and,
   k. the chamber of said opening solenoid,
   l. a spill passage interconnecting said chamber of said opening solenoid and,
   m. the outlet branch line from said valve housing,
   n. said spill passage and said passage from said secondary chamber to said opening solenoid including means adapted to release fluid from said secondary chamber through said chamber of said opening solenoid when said means is open permitting said faucet to open.

2. The invention of claim 1 further comprising:
   a. an inlet port leading from an external source of fluid pressure directly communicating with,
   b. said lower primary chamber,
   c. any fluid pressure received through said inlet port being directly applied to the piston surface contacting said primary chamber thereby urging said faucet to an open position.

3. The invention of claim 2 further comprising:
   a. a valve seat mounted in said housing adjacent said inlet port,
   b. a valve shut-off seal mounted on said shaft secured to said piston, said valve shut-off seal constructed and arranged to securely contact said valve seat closing said faucet, said faucet remaining open when said seat is not so contacted, and
   c. a diametrical restrictor projecting from said valve shut-off seal, said diametrical restrictor constructed in a configuration adapted to project into said valve seat as said valve shut-off seal moves toward said valve seat.

4. The invention of claim 3 further comprising:
   a. a spring connected to said shaft of said piston, said spring being tensioned in such a manner as to normally urge said valve shut-off seal and said diametrical restrictor in the direction of said valve seat.

5. The invention of claim 1 further comprising:
   a. a switch positioned remote from said closing solenoid connected to said solenoid by a wiring harness means,
   b. said switch being connected to an external source of electrical energy adapted to control said solenoid from a position remote to said faucet.

6. The invention of claim 1 further comprising:
   a. a spring operably connected to said shaft of said piston biasing said piston toward a faucet closed position.

7. The invention of claim 1 further comprising:
   a. a solenoid plunger seat mounted in said closing solenoid chamber intermediate said closing solenoid passage and said pressure passage to said secondary chamber,
   b. a solenoid plunger seat mounted in said opening solenoid chamber intermediate said passage to said secondary chamber and said opening solenoid and said spill passage, and
   c. the contacting or lack of contacting of said plunger seats by said solenoids controlling the flow of pressure to and from said secondary chamber.

* * * * *